MONOSTABLE INVERTER EMPLOYING A NEGATIVE RESISTANCE DIODE

Filed Dec. 14, 1962

INVENTOR
C. J. N. CANDY
BY G. E. Kersey

United States Patent Office 3,234,403
Patented Feb. 8, 1966

3,234,403

MONOSTABLE INVERTER EMPLOYING A NEGATIVE RESISTANCE DIODE

Charles J. N. Candy, Convent Station, N.J., assignor to Bell Telephone Laboratories, Incorporated, New York, N.Y., a corporation of New York Filed Dec. 14, 1962, Ser. No. 244,650
5 Claims. (Cl. 307—88.5)

This invention relates to the inversion of signals, particularly high-frequency pulse signals.

The inversion of signals is often required in the carrying out of operations dictated by logic circuits. At low frequencies, such inversion is satisfactorily and simply carried out with transformers. However, at high frequencies transformers become unsatisfactory because of parasitic effects. In addition, transformers do not provide power gain.

On the other hand, the conventional compensation of parasitic effects at high frequencies leads to inverter configurations that are disadvantageous because of their complexity and the attendant bulk of their components which mitigates against the miniaturization that is often desired in logic circuits.

Accordingly, it is an object of the invention to accomplish the inversion of signals at high frequencies. A related object is to achieve the inversion of pulse signals using circuit components that facilitate miniaturization.

In accomplishing the foregoing and related objects, a negative resistance device is employed in conjunction with a clamping device. Specifically, the input terminal of a negative resistance device taking the form of a negative resistance diode is connected to a clamping device, desirably a backward diode, which manifests a region of substantially constant signal level in its current voltage characteristic.

As a result, the backward diode prevents the input terminal from changing its signal level in response to an applied pulse signal. Consequently, the changes in signal level that take place at the other terminal of the negative resistance diode are inverted with respect to the pulse signal producing them.

Figure 1:
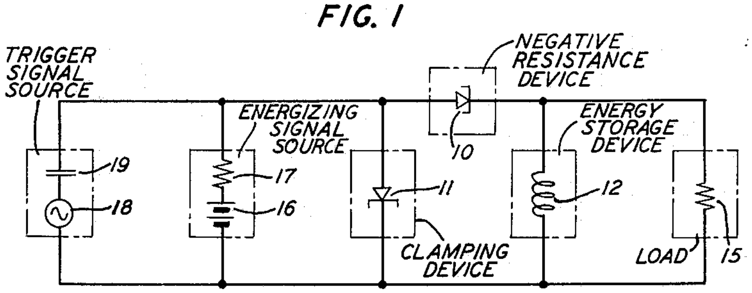
Figure 2A:
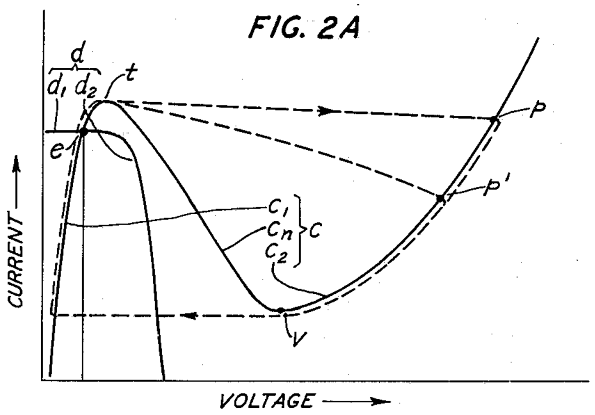
Figure 2B:
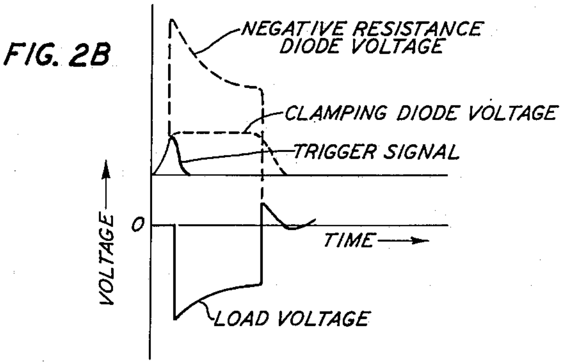

Other aspects of the invention will become apparent after considering an illustrative embodiment taken in conjunction with the drawings in which:

FIG. 1 is a block and schematic diagram of a monostable inverter according to the invention; and FIGS. 2A and 2B are graphic diagrams explanatory of the operation of the inverter in FIG. 1.

In the representative inverter of FIG. 1, a negative resistance device, desirably a negative resistance diode 10, is operated in conjunction with a clamping device desirably a so-called backward diode 11, and an energy storage device, desirably an inductor 12, in order to invert and amplify a trigger signal originating at a trigger source and intended for a load represented by a resistor 15. An appropriate operating point for the negative resistance diode 10 is established by a biasing source which advantageously is of a constant current variety formed by the series combination of a battery 16 and a resistor 17 of appreciable resistive magnitude. Isolation of an internal signal generator 18 of the trigger source from the biasing source is afforded by the inclusion in the former of a capacitor 19 which charges to the steady state voltage level presented at the terminals of the biasing source.

An understanding of the way in which signal inversion is accomplished by the inverter in FIG. 1 can be obtained by considering FIG. 2A. Shown in the latter is the current-voltage characteristic $c$ of a typical negative resistance diode. It includes first and second regions $c_1$ and $c_2$ of positive resistance separated by an intervening region $c_n$ of negative resistance. Intersecting the diode characteristic is a steady-state load line $d$ attributable to the biasing source and the clamping device. There is substantially no contribution to the load line from the energy storage device since it presents a negligible steady-state impedance.

Therefore, the load line $d$ adopts the inverted form of the characteristic presented by the backward diode alone, and, commencing at the point along the current axis corresponding to the unloaded output of the biasing source, presents a region $d_1$ of substantial impedance followed by a region $d_2$ of negligible impedance. Both the backward diode and the biasing current source are proportioned so that the region $d_1$ of substantial load line impedance intersects the diode characteristic at a position $e$ in its first region $c_1$ of positive resistance, beyond which the load line presents a region $d_2$ of negligible impedance.

Hence in the absence of a trigger signal, the inverter is in stable equlibrium, represented by the intersection point $e$ of FIG. 2A, and the voltage at the load is substantially zero. However, when a trigger signal is applied, carrying the negative resistance diode beyond the threshold-point of its characteristic, the diode rapidly switches through its negative resistance region $c_n$ to a transition point $p$ in its second region $c_2$ of positive resistance. When the impedance of the load resistor 15 is appreciable the switching takes place along a dashed-line $t$–$p$ locus that is substantially parallel with the voltage axis inasmuch as the current through the inductor 12 is little changed during the switching.

At the same time, the voltage appearing across the load undergoes an abrupt transition to the negative level shown in FIG. 2B. This is attributable to the clamping effect of the backward diode. As can be seen from FIG. 2A, once the operation is carried beyond the threshold point $t$ the voltage appearing at the terminals of the clamping device remain substantially constant because of the appreciable verticality of the load line, and the voltage at the load is the algebraic difference between the voltage across the negative resistance and clamping diodes. Since the load line $d$ does not intersect the diode characteristic in its second region $c_2$ of positive resistance the transition point $p$ is one of unstable equilibrium and the locus of operation moves from it to the valley point $v$ of the characteristic. During this interval the load and negative resistance diode voltage amplitudes decay as shown in FIG. 2B. At the valley point $v$ the locus of operation undertakes a sudden return transition to the first region $c_1$ of positive resistance, evidenced by the abrupt transitions in the amplitudes of FIG. 2B. Subsequently the locus of operation returns to the initial equilibrium point $e$.

The foregoing operation has assumed a substantial transient load impedance. To the extend that the transient impedance is otherwise, the transitional locus intersects the second region $c_2$ of positive resistance below the transition point $p$ discussed earlier, for example at point $p'$.

Other adaptations of the invention will occure to those skilled in the art.

What is claimed is:

1. An asymmetrical device characterized by a region in its current voltage characteristics of substantial impedance and a region of negligible impedance, a negative resistance device connected in common with said asymmetrical device and having a current voltage characteristic with the region of negative resistance separating contiguous regions of positive resistance, energy storage means interconnecting the two named devices with each other, biasing means connected to the common connection of said negative resistance device and said asymmetrical device, means connected to said common connection for applying an input signal thereto, and means connected across said energy storage means for extracting energy therefrom, whereby an input signal applied to said common connection results in an amplified and inverted counterpart of said input signal across the terminals of said energy storage device.

2. Apparatus comprising a negative resistance diode able to adopt any one of diverse signal states and having first and second terminals, means for clamping one of the terminals of said diode at a substantially constant signal level during a transition of said diode from one signal state to another, energy storage means interconnecting the clamping means with the other terminal of said diode for controlling the duration of said transition in said signal state, and means for biasing said diode for monostable operation, whereby said transition produces in said energy storage means a response that is inverted with respect to said constant signal level.

3. Apparatus for inverting a pulse signal which comprises a negative resistance device having a plurality of terminals, means for supplying energy to one terminal of said device, load means connected to another terminal of said device, and means for clamping the voltage level at the energized terminal in response to a pulse signal applied thereto, said device being biased for monostable operation, whereby an inverted and amplified counterpart of said applied signal is produced at the other terminal of said device.

4. Apparatus comprising a backward diode, a negative resistance diode, said backward diode and said negative resistance diode being connected to a junction point and being commonly poled with respect thereto, an inductor interconnecting said backward diode with said negative resistance diode, and means connected to said junction point for biasing said apparatus for monostable operation, whereby a pulse signal applied to said junction point produces an amplified and inverted counterpart at said inductor.

5. Apparatus comprising a pair of input terminals to which trigger signals are applied, voltage clamping means interconnecting said input terminals with each other, a pair of output terminals, energy storage means interconnecting said output terminals with each other for timing the response of said apparatus to said trigger signals, means, including negative resistance means, for interconnecting said clamping means with said energy storage means, and means, acting in concert with said clamping means and said energy storage means, for biasing said negative resistance means for monostable operation.

References Cited by the Examiner

UNITED STATES PATENTS 3,115,584 12/1963 Yao -------------- 307—88.5

OTHER REFERENCES

Pub. II: "Tunnel Diode-Transistor Inverter," by Amodei et al. in RCA Technical Notes, RCA TN No. 434, dated January 1961.

Pub. I: "Bistable Self-Resetting Tunnel Diode Amplifier," by Bergman in RCA Technical Notes, RCA TN No. 500 dated September 1961.

Pub. III: "Tunnel Diode-Transistor Monostable Pulse Generator," by Burns in RCA Technical Notes, RCA TN No. 532, dated March 1962.

DAVID J. GALVIN, *Primary Examiner.*

ARTHUR GAUSS, *Examiner.*